(12) United States Patent
Uhl

(10) Patent No.: US 6,786,192 B2
(45) Date of Patent: Sep. 7, 2004

(54) PORTABLE, MANUALLY GUIDED IMPLEMENT

(75) Inventor: Klaus-Martin Uhl, Baltmannsweiler (DE)

(73) Assignee: Andreas Stihl AG & Co. KG (DE)

( * ) Notice: Subject to any disclaimer, the term of this patent is extended or adjusted under 35 U.S.C. 154(b) by 0 days.

(21) Appl. No.: 10/390,223

(22) Filed: Mar. 17, 2003

(65) Prior Publication Data

US 2003/0172898 A1 Sep. 18, 2003

(30) Foreign Application Priority Data

Mar. 18, 2002 (DE) .......................................... 102 11 874

(51) Int. Cl.$^7$ ................................................ F01P 1/02
(52) U.S. Cl. ................ 123/198 E; 123/41.7; 123/41.56
(58) Field of Search ........................... 123/198 E, 41.7, 123/41.56

(56) References Cited

U.S. PATENT DOCUMENTS 5,269,665 A * 12/1993 Sadler et al. ................ 417/363
5,595,153 A * 1/1997 Hoppner et al. ........ 123/198 E \* cited by examiner Primary Examiner—Thomas Denion
Assistant Examiner—Zelalem Eshete
(74) Attorney, Agent, or Firm—R W Becker & Associates; R W Becker

(57) ABSTRACT

An implement is provided having a motor housing in which is disposed an internal combustion engine as a drive for a tool. The implement also includes a carburetor and an air filter. An air filter chamber is provided with a cover element that includes two cover portions, a first cover portion of which extends over the air filter chamber, and a second cover portion of which extends over a ventilated hollow space of the motor housing that is adjacent to the air filter chamber. At least one in-flow passage for the combustion air is provided and in the first cover portion opens into the air filter chamber. At least one further passage is provided for connecting the hollow space with the in-flow passage.

20 Claims, 4 Drawing Sheets

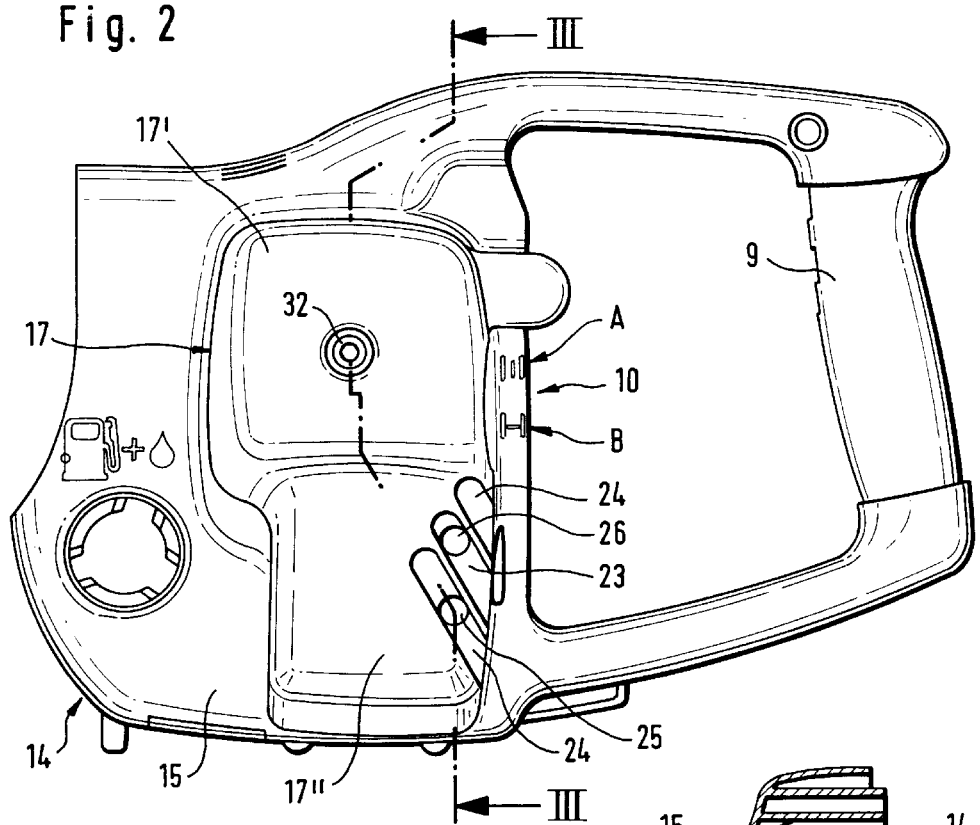

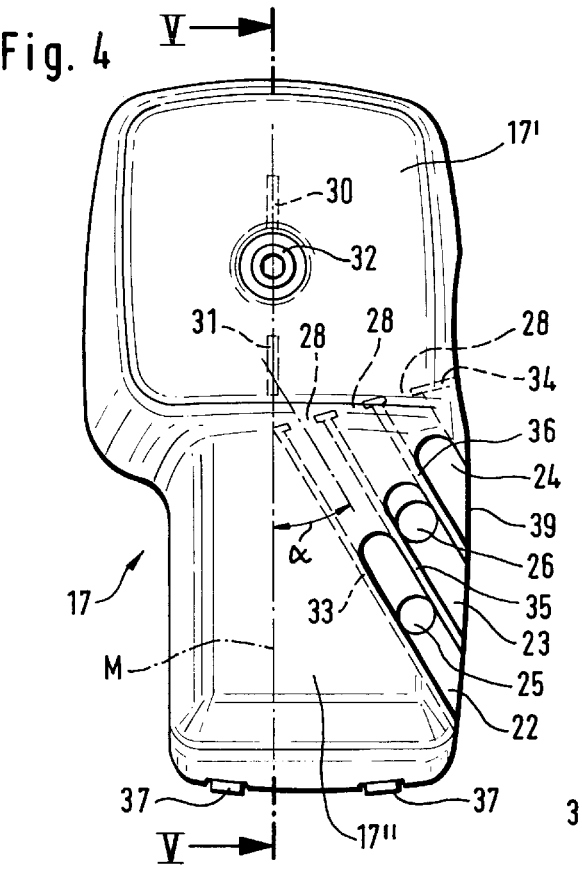
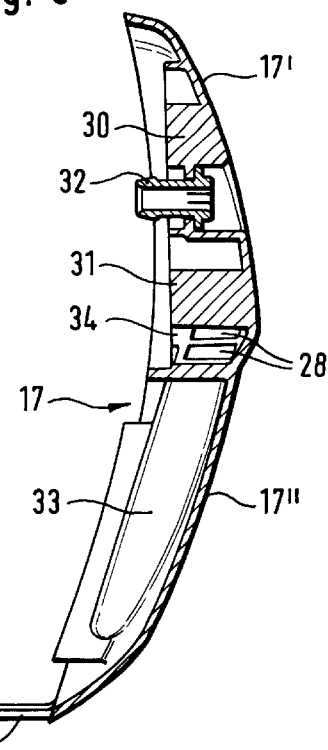
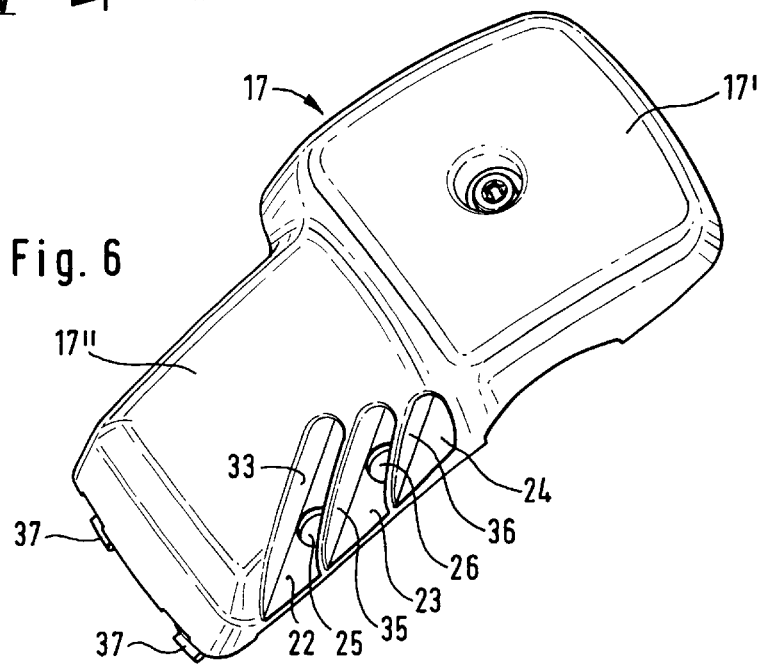

PORTABLE, MANUALLY GUIDED IMPLEMENT

BACKGROUND OF THE INVENTION

The present invention relates to a portable, manually-guided implement having a motor housing in which is disposed an internal combustion engine as a drive means for a tool or the like. The implement also has a carburetor as well as, upstream thereof, an air filter chamber that accommodates an air filter, whereby the air filter chamber is provided with a cover element in which is disposed at least one air inlet opening for the entry of combustion air.

Portable, manually guided implements having an internal combustion engine that serves for driving a tool are known, for example, as power chain saws, brush cutters, cut-off machines, drills, or the like. The combustion air that is required for the internal combustion engine is cleaned in an air filter in order to prevent the carburetor and/or the cylinder from becoming dirty. In this connection, the filter element is placed in an air filter chamber that is closed off by a removable cover element in order to be able to open the filter chamber for the purpose of cleaning and/or exchanging the filter insert. Such a cover element is conventionally provided with slits that serve as an inlet opening for the combustion air into the air filter chamber.

Depending upon how the implement is handled by the operator, it is possible that the air inlet openings in the cover element unintentionally become covered without the operator noticing that this has happened. This leads to too little or even no combustion air being drawn in any longer, and hence to a shutdown of the internal combustion engine.

It is therefore an object of the present invention to improve an implement of the aforementioned general type in such a way that an adequate supply of combustion air into the air filter chamber is always ensured.

BRIEF DESCRIPTION OF THE DRAWINGS

This object, and other objects and advantages of the present invention, will appear more clearly from the following specification in conjunction with the accompanying schematic drawings, in which:

FIG. 2 is a side view of a housing having a handle;

FIG. 3 is a partially schematic cross-sectional view taken along the line III—III in FIG. 2;

FIG. 4 is a front view of a cover element for an air filter;

FIG. 5 is a cross-sectional view taken along the line V—V in FIG. 4;

FIG. 6 is a perspective view of the cover element of FIG. 4;

SUMMARY OF THE INVENTION

Figure 1:
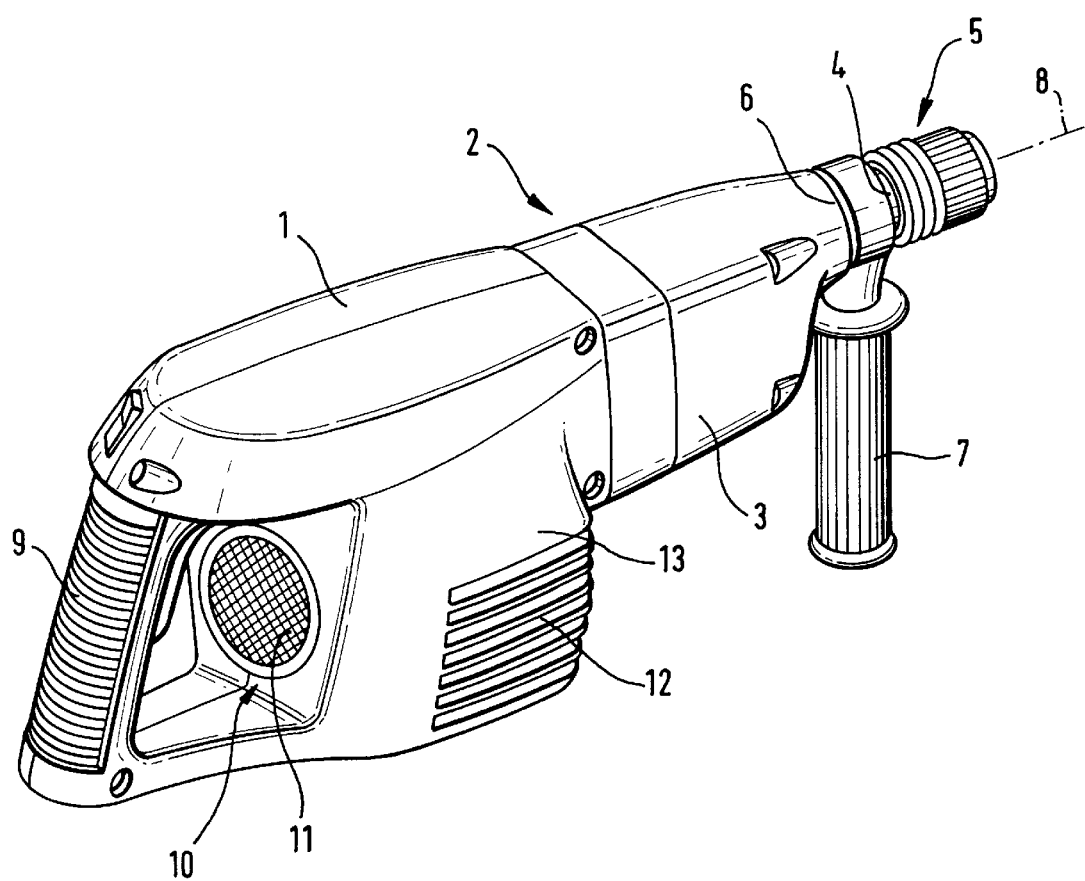
FIG. 1 shows a portable drill.

The implement of the present invention is characterized primarily in that it has a cover element that includes two cover portions, namely a first cover portion that extends over the air filter chamber, and a second cover portion that extends over a ventilated hollow space of the motor housing that is adjacent to the air filter chamber, whereby at least one in-flow passage for the combustion air is disposed in the second cover portion and, in the first cover portion, opens into the air filter chamber, and whereby at least one further passage is provided for connecting the hollow space with the in-flow passage.

As a consequence of the inventive arrangement, accompanied by free access of the in-flow passage, the air from the outside of the cover element enters the in-flow passage and is supplied therethrough to the air filter chamber. The further passage that connects the ventilated hollow space in the motor housing with the in-flow passage has no influence upon the combustion air during normal functioning. However, if the in-flow passage becomes partially or completely closed off on the intake side, for example by being unintentionally covered, the necessary air is partially or entirely drawn in through the further passage from the hollow space in the motor housing, with the hollow space in turn being ventilated from the outside of the motor housing.

Pursuant to one particular embodiment of the invention, three in-flow passages are disposed in the second cover portion. In this connection, it is expedient that the in-flow passages extend parallel to one another and are linear. Such a configuration is advantageous for the manufacture of the cover element as an injection molded part.

Pursuant to a further embodiment of the present invention, the in-flow passages can be oriented such that their longitudinal axes form an angle with the central longitudinal axis of the cover element. This angle is, for example, between 25 and 40°, and is preferably about 32°. With in-flow passages that extend at an angle relative to the central longitudinal axis of the cover element it is expedient that these in-flow passages begin at a longitudinal side of the cover element. Furthermore, it is advantageous that the in-flow passages be open over a partial length thereof relative to the outer side of the second cover portion, with the other partial length being embodied as a closed channel. In this way, as large an opening portion of the in-flow passages as possible at their inlet side is provided.

A partition is provided in the second cover portion between the in-flow passages and the hollow space. Provided in the partition are the further passages that connect the hollow space with the in-flow passages. Pursuant to one preferred embodiment of the present invention, passages are provided in the partition to two in-flow passages. The hollow space in turn is connected via venting openings with the outside of the motor housing.

Pursuant to a preferred further embodiment of the invention, a connecting channel that leads to the carburetor is disposed on the clean side of the filter chamber. The connecting channel is expediently made of a rubber or other elastomeric material, and is provided on its air filter end with a flange by means of which it can be inserted or held in an opening of a wall of the air filter housing. At that end that is adjacent to the carburetor, preferably two curved sections are provided for achieving a splutter pan effect. Pursuant to a further embodiment, a choke valve can be disposed in the filter chamber and can be pivotable between a position that releases the connecting channel and a position that closes off the connecting channel.

Further specific features of the present invention will be described in detail subsequently.

DESCRIPTION OF PREFERRED EMBODIMENTS

Referring now to the drawings in detail, the portable drill 2 that is schematically illustrated in FIG. 1 essentially comprises a motor housing 1 having disposed therein an internal combustion engine as a drive motor. By means of a centrifugal clutch, the internal combustion engine drives a gear or transmission mechanism 3 that is disposed at the front end of the motor housing 1 and that is preferably disposed in a gear housing in an encased manner; the gear mechanism 3 is provided with an output shaft 4 that carries a tool chuck 5. By means of an annular flange, a front handle 7 is preferably secured to a neck 6 or shank of the motor housing adjacent to the tool chuck 5; the handle 7, which is rotatable about the longitudinal axis 8 of the drill, can be positioned in any desired rotational position. For holding and guiding the portable drill 2, a handle 9 is furthermore disposed on the rear end face 10 as viewed in the direction of the longitudinal axis 8; the handle 9 bridges or spans the end face 10.

As indicated in FIG. 1, a plurality of apertures or passages 11 for air are disposed in the open end face 10. Disposed behind the air apertures 11 is a cooling-air fan that draws cooling air into the motor housing 1 in order to cool the internal combustion engine disposed therein. The internal combustion engine can be a port-controlled two-cycle engine, a valve-controlled two-cycle engine, a four-cycle engine, or some other type of internal combustion engine. The drawn-in cooling air is, by means of cooling-air slits or vents 12 in the side wall 13, blown out, via cooling-air slots that are not illustrated in FIG. 1, to the front tool chuck 5 in the direction of the longitudinal axis 8 of the drill. The drawing-in of the air for combustion is effected on that side of the motor housing 1 that is not visible in FIG. 1, i.e. the side wall that is opposite the side wall 13.

FIG. 2 shows a side view of a portion of the motor housing, and in particular of a housing element 14 that is monolithically formed with a portion of the handle 9 that spans the end face 10. The housing element 14 includes a side wall 15 that delimits the motor housing on that side that is not visible in FIG. 1.

FIG. 3 is a cross-sectional view taken along the line III—III in FIG. 2, whereby the path of the drawn-in air for combustion is indicated with the aid of flow arrows. The same reference numerals are used for the same components in FIGS. 2 and 3.

As can be seen from FIGS. 2 and 3, a filter chamber 18 is formed in the region of the side wall 15, and within the housing element 14, adjacent to the filter chamber 18 there is also formed a hollow space 20, in which a carburetor 19 is disposed. The clean air side of the filter chamber 18 that is integrated in the motor housing 1 communicates with the carburetor 19 via a connecting channel 21, which is preferably embodied as an elbow of rubber or other elastomeric material. Pivotably mounted in the filter chamber 18 is a choke valve 40 which in its lower position closes off the connecting channel 21.

The filter chamber 18, which is open toward the outer side of the housing element 14, and the hollow space 20, are covered relative to the outer side by means of a cover element 17. This cover element includes a first cover portion 17', which covers the filter chamber 18, and a second cover portion 17", which covers the hollow space 20. An air filter 16 is disposed between the first cover portion 17' and the housing element 14. The cover element 17 is held on the housing element 14 via a threaded sleeve 32 that is provided in the first cover portion 17' and is threaded onto a threaded bolt 38, whereby the lower end on the second cover portion 17" is held via hooks 37 that extend into the housing element 14.

Formed in the cover element 17 in the second cover portion 17" are in-flow passages 22,23 and 24 that lead to passages or apertures 28 and thus open into the filter chamber 18. Disposed in a partition 29 of the second cover portion 17", which partition extends in front of the hollow space 20, are passages 25 and 26 that connect the in-flow passages 22 and 23 with the hollow space 20. The hollow space 20 is ventilated and communicates with the outer side of the housing element 14 via venting openings 27.

In accordance with the flow arrows shown in FIG. 3, the drawn-in air for combustion passes through the in-flow passages 22, 23 and 24 into the second cover portion 17" of the cover element 17 and passes through the inlet passages or apertures 28 into the filter chamber 18. The air for combustion passes through the air filter 16 and, via the connecting channel 21, passes through the carburetor 19. If due to carelessness of the operator, or an incorrect position of the hand of the operator, the in-flow passages 22,23 and 24 are to a large extent or even entirely covered, air is drawn in via the passages 25 and 26 from the hollow space 20 that is ventilated from the outside, and the air thus passes via the aperture 28 into the filter chamber 18.

FIG. 4 shows a front view of the cover element 17. The same reference numerals are used for those components that coincide with those shown in FIGS. 2 and 3. As shown in FIG. 4, the in-flow passages 22, 23 and 24 are open toward the front side over a portion of their length, so that a larger opening results at the inlet portion of the passages. Over the other portion of their length, the in-flow passages 22, 23 and 24 are embodied as closed, tubular channels that, as seen from the front side, are covered, and are therefore illustrated by dashed lines.

As can be further seen in FIG. 4, the in-flow passages 22, 23 and 24 are linear and extend parallel to one another. In this connection, the longitudinal axes of the in-flow passages are disposed at an angle α to a central longitudinal axis M of about 20 to 40°; in the illustrated embodiment, the angle α is approximately 32°. In this way, the in-flow passages 22, 23 and 24 begin at a longitudinal side 39 of the cover element 17.

FIG. 5 is a cross-sectional view taken along the line V—V in FIG. 4, and FIG. 6 shows a perspective view of the cover element 17. Thus as can be seen in particular from FIGS. 4 and 5, the individual in-flow passages 22, 23 and 24 are separated from one another by passage walls 33, 35 and 36 that are guided to a transverse wall 34. The transverse wall 34 is provided with the passages or apertures 28 via which the in-flow passages 22, 23 and 24 open into the filter chamber 18 that is disposed behind the first cover portion 17'. Disposed upon the inner side of the first cover portion 17' are support walls 30, 31 that serve for fixing the air filter 16, which is shown in FIG. 3, in its position. The passages 25 and 26 are visible in that portion of the in-flow passages 22 and 23 that are not covered by the second cover portion 17". Disposed at the lower end of the second cover portion of 17" are the hooks 37 for the attachment into the housing element, as can be seen from FIG. 3.

Figure 7B:
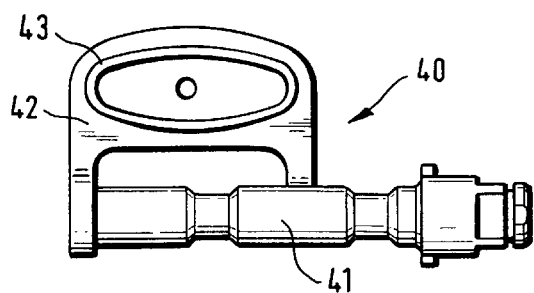
FIGS. 7a and 7b are a perspective view and a view from below of a choke valve.
Figure 7A:
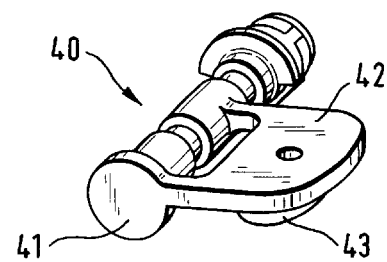
Figure 8B:
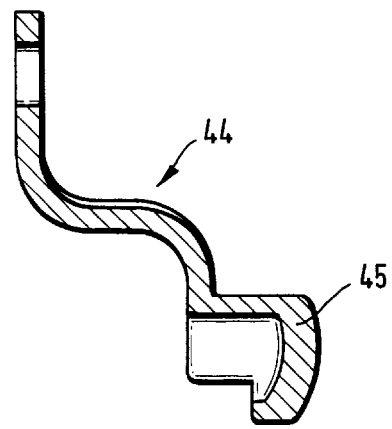
FIGS. 8a and 8b are a perspective view and a longitudinal cross-sectional view of a valve lever.
Figure 8A:
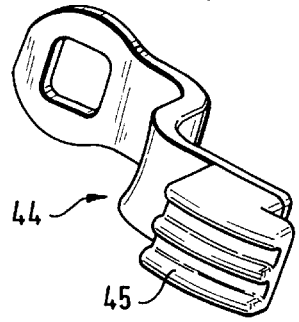

FIGS. 7a and 7b show various views of the choke valve 40, which includes a valve shaft 41 and a plate 42. On that side facing the elbow that forms the connecting channel 21, the plate 42 is provided with an oval projection 43 that serves to improve the closing function. At one end, the valve shaft 41 is embodied for receiving a valve lever 44, which is illustrated in FIGS. 8a and 8b. The free end of the valve lever 44 is provided with an actuating or control head 45 that in the installed state of the choke valve is disposed on the outer side of the cover element 17 or the side wall 15 (see FIG. 3) and is thus accessible for actuation. On that side that faces the control head 45 the cover element 17 is embodied in such a way that when force acts upon it in a given direction it is supported, so that the cover element 17 acts as a protection against breaking. The control head 45 can be adjusted into two stable positions, which are indicated in FIG. 2 by the reference symbols A and B, and in which the valve lever 42 can be arrested.

Figure 9B:
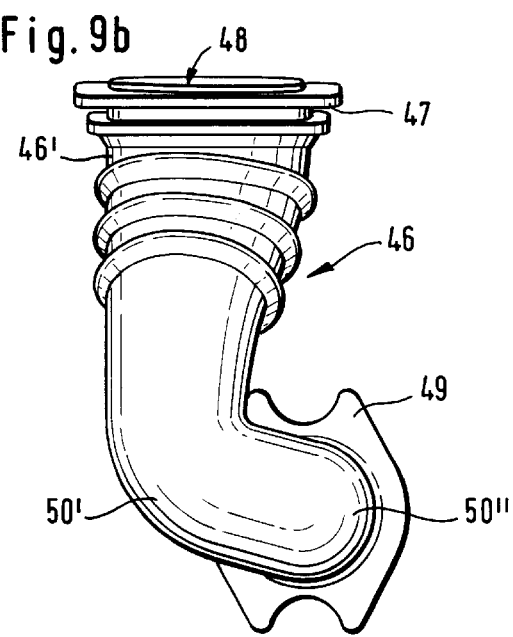
FIGS. 9a and 9b are a perspective view and a front view of a connecting channel to the carburetor.
Figure 9A:
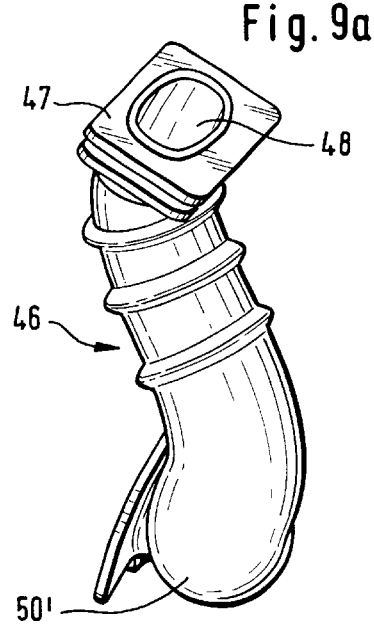

FIGS. 9*a* and 9*b* show the connecting channel 21 which in the illustrated embodiment is an elbow 46 made of elastomeric material. At the upper end, which is adjacent to the air filter 16, the elbow 46 is provided with a flange 47 that can be inserted and held in an opening of a wall that delimits the filter chamber 18; formed in the flange 47 is a passage opening 48 that has an oval cross-section. In the region adjoining the flange 47 the elbow 46 is embodied in the manner of a bellows. That region of the elbow that is adjacent to the carburetor is provided with two curved sections 50' and 50" that each correspond to about 90°, so that the flow of the combustion air experiences two distinct deflections before the air enters the carburetor at the carburetor flange 49. As a consequence of the curved sections 50' and 50" a passage guidance is achieved that results in a splutter pan function, i.e. droplets of fuel that under certain operating conditions pass from the carburetor into the elbow 46 are trapped in the curved sections and during the next adequate drawing-in or intake of the internal combustion engine are again carried along and are received in the air stream.

The specification incorporates by reference the disclosure of German priority document 102 11 874.4 filed Mar. 18, 2002.

The present invention is, of course, in no way restricted to the specific disclosure of the specification and drawings, but also encompasses any modifications within the scope of the appended claims.

What is claimed is:

1. A portable, manually guided implement, comprising:
   a motor housing in which is disposed an internal combustion engine as a drive means for a tool, wherein also provided are a carburetor and upstream thereof an air filter chamber in which is disposed an air filter; and
   a cover element having a first cover portion and a second cover portion, wherein said first cover portion extends over said air filter chamber, and said second cover portion extends over a ventilated hollow space of said motor housing that is adjacent to said air filter chamber and in which said carburetor is disposed, wherein at least one in-flow passage for combustion air is disposed in said second cover portion and, in said first cover portion, opens into said air filter chamber, and wherein at least one further passage is provided for connecting said hollow space with said at least one in-flow passage.

2. An implement according to claim 1, wherein three in-flow passages are disposed in said second cover portion.

3. An implement according to claim 2, wherein said in-flow passages extend parallel to one another.

4. An implement according to claim 1, wherein said at least one in-flow passage extends linearly.

5. An implement according to claim 4, wherein a longitudinal axis of said at least one in-flow passage and forms an angle with a central longitudinal axis of said cover element.

6. An implement according to claim 5, wherein said angle is between 25 and 40°.

7. An implement according to claim 6, wherein said angle is approximately 32°.

8. An implement according to claim 5, wherein said at least one in-flow passage begins on a longitudinal side of said cover element.

9. An implement according to claim 2, wherein said in-flow passages have a first partial length that is open relative to an outer side of said second cover portion, and a second partial length that is embodied as a closed channel.

10. An implement according to claim 1, wherein a partition is provided in said second cover portion that separates said at least one in-flow passage from said hollow space.

11. An implement according to claim 10, wherein said at least one further passage is provided in said partition.

12. An implement according to claim 11, wherein further passages to two in-flow passages are provided in said partition.

13. An implement according to claim 1, wherein said hollow space communicates with an outer side of said motor housing via venting openings.

14. An implement according to claim 1, wherein said carburetor is disposed in said motor housing.

15. An implement according to claim 1, wherein a clean air side of said air filter chamber communicates via a connecting channel with said carburetor, and wherein combustion air is guided through said connecting channel.

16. An implement according to claim 15, wherein said connecting channel s embodied as an elbow that is made of elastomeric material and that is provided at one end thereof with an insertable flange, and wherein two curved sections are provided adjacent to another end of said elbow.

17. An implement according to claim 15, wherein a pivotably mounted choke valve is disposed in said air filter chamber on said clean air side thereof, and wherein said choke valve is movable between a position that closes off a passage opening of said connecting channel, and a second position that releases said passage opening.

18. An implement according to claim 17, wherein said passage opening of said connecting channel has an oval cross-section, wherein said choke valve is provided with a plate and wherein said plate is provided with an oval projection that in said first, closing position extends into said passage opening.

19. An implement according to claim 17, wherein a valve lever is provided for actuating said choke valve, and wherein said valve lever includes a control head that is disposed on an outer side of said cover element and is diplaceably held thereon.

20. An implement according to claim 19, wherein at least one of said control head and said valve lever are, with regard to positions of said choke valve, adjustable into, and arrestable in, two defined positions for closing off and releasing said passage opening of said connecting channel.

* * * * *